(12) United States Patent
Takahashi

(10) Patent No.: US 6,266,461 B1
(45) Date of Patent: Jul. 24, 2001

(54) OPTICAL FIBER SWITCH CIRCUIT

(75) Inventor: Mitsuo Takahashi, Matsudo (JP)

(73) Assignee: Seikoh Giken Co., Ltd., Chiba-Ken (JP)

( * ) Notice: Subject to any disclaimer, the term of this patent is extended or adjusted under 35 U.S.C. 154(b) by 0 days.

(21) Appl. No.: 09/166,293

(22) Filed: Oct. 5, 1998

(30) Foreign Application Priority Data

Jun. 9, 1998 (JP) .................................................. 10-161002

(51) Int. Cl.⁷ ...................................................... G02B 6/27
(52) U.S. Cl. ................................ 385/17; 385/20; 385/22
(58) Field of Search ................................ 385/17, 20, 22, 385/21

(56) References Cited

U.S. PATENT DOCUMENTS

| | | |
|---|---|---|
| 5,024,497 | 6/1991 | Jebens . |
| 5,035,482 * | 7/1991 | Ten Berge et al. ................. 350/96.2 |
| 5,268,975 | 12/1993 | Yoshitani et al. . |
| 5,434,936 | 7/1995 | Nagaoka et al. . |

FOREIGN PATENT DOCUMENTS

| | | |
|---|---|---|
| 0 644 447 | 3/1995 | (EP) . |
| 2 088 083 | 6/1982 | (GB) . |

OTHER PUBLICATIONS

Fujiwara et al, "Photonic Space–Division Switching Technologies for Broadband Networks", 2334b IEICE Transactions on Communications, E77–B(1994) Feb., No. 2, Tokyo, JP, pp. 110–118.

* cited by examiner

Primary Examiner—Frank G. Font
Assistant Examiner—Andrew H. Lee
(74) Attorney, Agent, or Firm—Venable; Robert J. Frank

(57) ABSTRACT

An optical fiber switch circuit combines optical fiber switches that are capable of switching the connection of many circuits at the same time by using fewer actuators. The optical fiber switch circuit combines at least one N x 2N, N being equal or greater than 1 optical fiber switch which employs optical fibers for switching the connection of an N number of movable optical fibers from one N number of fixed optical fibers of a 2N number of fixed optical fibers to the other N number of fixed optical fibers at the same time.

10 Claims, 10 Drawing Sheets

C~C

C~C

US 6,266,461 B1

OPTICAL FIBER SWITCH CIRCUIT

BACKGROUND OF THE INVENTION

1. Field of the Invention

The present invention relates to an optical fiber switch member and optical fiber switching circuits used for an optical fiber communications system. More particularly, it relates to an optical fiber switch circuit composed of at least one N×2N (N>1) switch optical fiber member capable of switching the connections of an N number of switches at the same time by a single actuator.

2. Description of the Related Art

A 1×2 optical fiber switch, such as the one disclosed in U.S. Pat. No. 5,434,936 is known. First and second fixed optical fibers are adhesively fixed on the bottoms of oppositely provided V grooves in such a manner that the distal end surfaces thereof are aligned. The outer surfaces of movable optical fibers are provided with films made of a magnetic material, the portions provided with the films made of the magnetic material being disposed in a magnetic field of a permanent magnet. The portions coated by the films are driven and displaced toward the first and second fixed optical fibers alternately by changing the magnetic force acting on the films made of the magnetic material by actuators constituted by the permanent magnet and a solenoid coil, thus switching the connection.

Referring to FIG. 7, an optical fiber switch circuit constructed using the 1×2 optical fiber switchs mentioned above will be described. FIG. 7 shows the circuit corresponding to a case constituted by connecting seven 1×2 optical fiber switches.

In FIG. 7, the movable optical fibers of 1×2 optical fiber switches 201 through 207 are driven by actuators making use of the foregoing solenoid coils and magnetism.

A typical way to construct an optical fiber switch circuit switch members each having one input and 4 outputs employing such 1×2 optical fiber switches, is to connect seven 1×2 optical fiber switches in series as illustrated in FIG. 7. The optical fibers of the 1×2 optical fiber switches are connected by optical connectors or electric discharge fusion between the fibers.

The connection of the optical fiber switch of FIG. 7 is made as set forth below. To connect a port A with a port #1, the movable optical fibers of the 1×2 optical fiber switches 201, 202, and 204 are respectively connected to the upper fixed optical fibers as illustrated. To connect the port A with a port #5, the movable optical fibers of the 1×2 optical fiber switch 201 is connected to the lower fixed optical fiber, and the movable optical fibers of the 1×2 optical fiber switch is 203 and are connected to the upper fixed optical fibers. The switching operation is accomplished by switching the polarity of the current flowing through the solenoid coil of the actuator provided for each of the 1×2 optical fiber switches 201 through 207.

Hence, the optical fiber switch circuit configured as described above requires seven 1×2 optical fiber switches, seven control and drive circuits together with wiring therefor, and the connections of six pairs of optical fibers. This inevitably requires a large space for housing the switches themselves and their associated components and also leads to complicated wiring. Likewise, an optical fiber switch circuit having one input and 16 outputs requires fifteen 1×2 optical fiber switches, fifteen control and drive circuits together with wiring therefor and the connections of fourteen pairs of optical fibers. An optical fiber switch circuit having one input and 32 outputs requires thirty-one 1×2 optical fiber switches, thirty-one control and drive circuits together with wiring therefor and the connection of thirty pairs of optical fibers.

FIG. 8 shows the configuration of an optical fiber switch circuit having 2 inputs and 8 outputs. This optical fiber switch circuit is constituted by two pairs of optical fiber switch circuits each having one input and 4 outputs, namely, the optical fiber switch circuit comprised of three 1×2 optical fiber switches 208, 210, and 211, and the 1×4 optical fiber switch circuit comprised of three 1×2 optical fiber switches 209, 212, and 213 as illustrated. The optical fiber switch circuit configured as described above requires six 1×2 optical fiber switches, six control and drive circuits and wiring therefor, and the connections of four pairs of optical fibers. Hence, as in the case of the foregoing optical fiber switch, circuit the sizes of the switches themselves respectively equipped with actuators increase, the wiring becomes complicated, and the number of connections of the optical fibers also increases.

FIG. 9 shows an optical fiber switch circuit, namely, a 4×4 matrix optical fiber switch circuit having 4 inputs and 4 outputs constituted by employing eight optical fiber switch members each having one input and 4 outputs. Each of reference numerals 214 through 221 is a composed of three 1×2 optical fiber switches. Sixteen optical fibers 222 are provided and connected as illustrated. The 4×4 matrix optical fiber switch shown in FIG. 9 is a matrix optical fiber switch circuit that has a function for connecting the optical fibers of an arbitrary port A, B, C, or D in the left column to an arbitrary port #1, #2, #3, or #4 in the right column. The 4×4 matrix optical fiber switch circuit requires twenty-four 1×2 optical fiber switches and a circuit wiring for connecting twenty-four actuators.

Thus, the optical fiber switch circuits shown in FIGS. 7–9 pose a problem in that the size of the switch itself inevitably increases, the control and drive circuit and the wiring becomes more complicated, and the number of connections of optical fibers also increases as the number of the switching circuits increases.

The optical fiber switches employed for the optical fiber switch circuits described above are publicly known; however, the connection of the respective circuits has been made by the inventor and is not known to have been described previously. Therefore, the connection of the respective optical fiber switch circuits is not considered prior art.

SUMMARY OF THE INVENTION

Accordingly, it is a major object of the present invention to provide an optical fiber switch circuit that combines at least one 1×2optical fiber switch employing optical fibers used for simultaneously switching the connection of an N number of movable optical fibers from one N number of fixed optical fibers of a 2N number of fixed optical fibers to the other N number of fixed optical fibers, and another optical fiber switch in accordance with the present invention.

It is another object of the present invention to provide an optical fiber switch circuit having 1 input and 8 outputs.

It is yet another object of the present invention to provide an matrix optical fiber switch circuit having N inputs and N outputs.

It is a further object of the present invention to provide an optical fiber switch circuit having two inputs and 8 outputs.

In order to achieve the major object, an optical fiber switch circuit configured by connecting a plurality of optical fiber switches is provided in accordance with the present invention, said optical fiber switch comprising: an alignment member main body which has a plurality first and second V shaped grooves, said first and second grooves opposing each other to form pairs of V grooves extending parallel to a Z-axis are aligned in a Y-direction, substantially perpendicular to said z-direction and a slit traversing said V grooves in an X-direction; substantially perpendicular to said y and z directions a 2N number of first and second fixed optical fibers located in the main body on a first side of the slit, one of said first optical fibers being positioned in each of said first grooves and one of said second fixed optical fibers being positioned in each of said second grooves, an N number of movable optical fibers located in said main body on a second side of said slit opposite the first side thereof, one of said moveable optical fibers being positioned in each pair of grooves so that the distal ends thereof are opposed to said fixed optical fibers and may be brought in contact with either of pairs of V grooves; a resilient a drive member which is inserted in said slit and engaged with said N number of movable optical fibers, said drive member being driven by said resilient pin to move said N number of movable optical fibers to a first position to optically couple them to said first fixed optical fibers 2N number of fixed optical fibers by bringing them into contact with one of said paired V grooves, and to a second position to couple them to the other N number of fixed optical fibers of said 2N number of fixed optical fibers by bringing them into contact with the other of said paired V grooves; wherein said optical fiber switch circuit comprises at least an N×2N (N=1) optical fiber switch and an N×2N (N=2) optical fiber switch having two input terminals thereof connected to two output terminals of said optical In order to achieve the another object, an optical fiber switch circuit is configured by connecting a plurality of optical fiber switches of the type described above said optical fiber switch circuit including a series connection of n switching members, said n switching members having $2^{n-1}$ m optical fiber switches therein, a single drive member driving all of the optical fiber switches in each of said n switching members via said resilient pin.

In order to achieve the yet another object, an N×N (N≧4) matrix optical fiber switch circuit is provided in accordance with the invention, which is configured by disposing an N number of said 1×2N optical fiber switch circuits in parallel, by preparing two N×(N×2N) switch circuits having an N number of input terminals and an N×2N number of output terminals, and by connecting an N×2N number of output terminals of a first switch circuit and an N×2N number of output terminals of a second switch circuit.

A 4×4 matrix optical fiber switch circuit is configured by disposing four 1×4 optical fiber switch circuits in parallel, by preparing two 4×16 switch circuits having four input terminals and 4×4 output terminals, and by connecting sixteen output terminals of a first switch circuit and sixteen output terminals of a second switch circuit.

In order to achieve a further object, an optical fiber switch circuit configured by connecting a plurality of optical fiber switches is provided in accordance with the present invention, said optical fiber switch being an N×2N optical fiber switch comprising:

an alignment member main body which has an N (N≧1) number of pairs of V grooves which are oppositely provided such that they are parallel to a Z-axis and aligned in a Y-direction, and a single slit formed across said V grooves in an X-direction; a 2N number of fixed optical fibers disposed in contact with the bottoms of said respective V grooves; an N number of movable optical fibers which are provided so that the distal ends thereof are opposed to said fixed optical fibers and may be brought in contact with either of pairs of V grooves; a drive member which is inserted in said slit and engaged with said N number of movable optical fibers and which is guided so as to be movable in the X-direction; and a single actuator which is engaged with said drive member and which is joined to said drive member to reciprocate it so as to move said N number of movable optical fibers to a first position to connect them to one N number of fixed optical fibers of said 2N number of fixed optical fibers by bringing them into contact with one of said paired V grooves, and to a second position to connect them to the other N number of fixed optical fibers of said 2N number of fixed optical fibers by bringing them into contact with the other of said paired V grooves; wherein said optical fiber switch circuit comprises at least an N×2N (N=2) optical fiber switch and an N×2N (N=4) optical fiber switch having four input terminals thereof connected to four output terminals of said optical fiber switch.

DESCRIPTION OF THE PREFERRED EMBODIMENT

The embodiments of the optical fiber switch in accordance with the present invention will be described in detail in conjunction primarily with the accompanying drawings.

FIGS. 1A through 1F show the optical fiber switch main body and drive members of an embodiment of an N×2N optical fiber switch (N=4) used in an optical fiber switch circuit in accordance with the present invention.

Figure 1A:
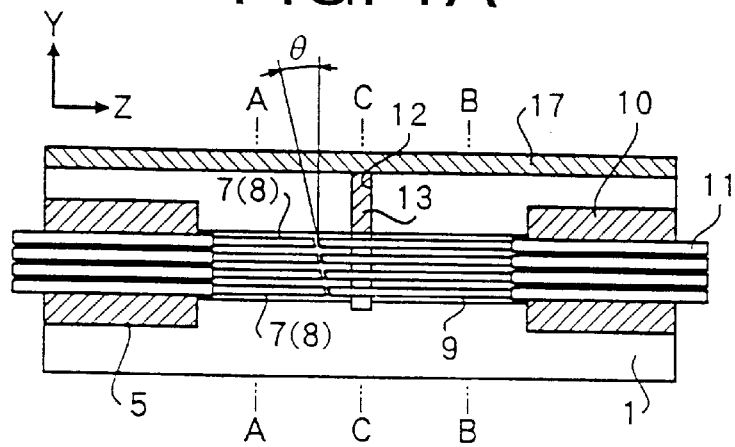
FIG. 1A is a front sectional view of an embodiment of the main body portion of an N×2N (N=4) optical fiber switch member in accordance with the present invention.

FIG. 1A is a front sectional view of the embodiment of the main body of the N×2N (N=4) optical fiber switch in accordance with the present invention.

Figure 1B:
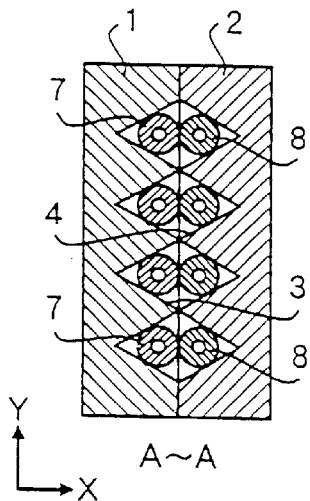
FIG. 1B shows a side sectional view of the embodiment at the line A—A.
Figure 1C:
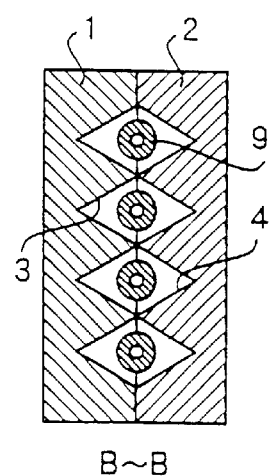
FIG. 1C shows a side sectional view of the embodiment at the line B—B.
Figure 1D:
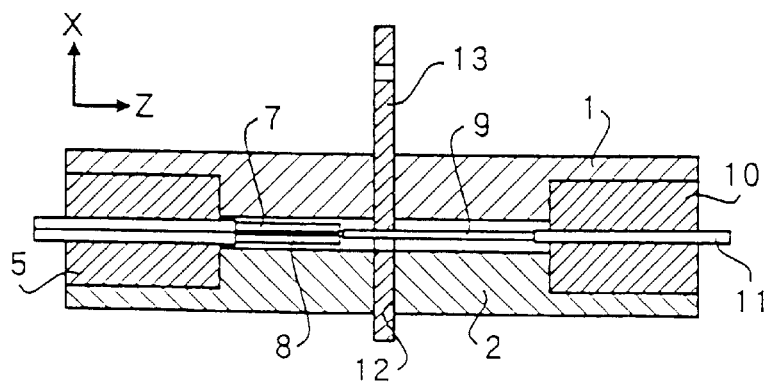
FIG. 1D is a top sectional view of the embodiment, movable optical fibers being located at a neutral position.
Figure 1E:
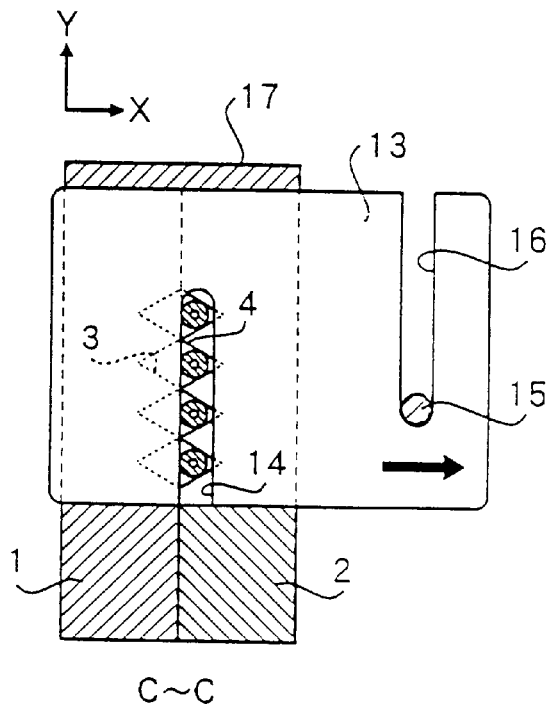
FIG. 1E is a side sectional view illustrative of the embodiment in a coupled state.
Figure 1F:
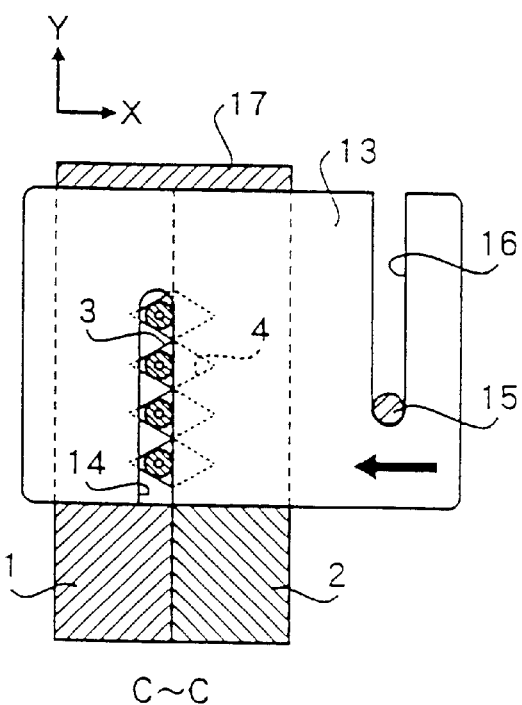
FIG. 1F is a side sectional view illustrative of the embodiment in another coupled state.

FIGS. 1B and 1C show side sectional views of the embodiment at the lines A—A and B—B, respectively, and FIG. 1D is a top sectional view of the embodiment, with the movable optical fibers being located at a neutral position. FIG. 1E is a side sectional view illustrative of the embodiment in a connected state, and FIG. 1F is a side sectional view illustrative of the embodiment in another connected state.

The N×2N optical fiber switch in accordance with the present invention is provided with parallel V grooves 3, . . . 3 and 4, . . . 4 for aligning an N number (N=4) of optical fibers. The parallel V grooves are formed in the opposed surfaces in the longitudinal direction (Z) of a first rectangular alignment member 1 and a second rectangular alignment member 2, respectively. As will be discussed later, the alignment members 1 and 2 are joined facing each other with the fixed and movable optical fibers arranged in a rhombic space formed by the respective parallel V grooves 3, . . . 3, and 4, . . . 4. A single slit 12 is provided in a lateral direction (X) so that it extends across the V grooves 3, . . . 3, and 4, . . . 4.

As shown in FIG. 1B, first fixed optical fibers 7, . . . 7 are bonded in the same spaces of the alignment V grooves 3, . . . 3 and second fixed optical fibers 8, . . . 8 are also bonded in the same spaces of the alignment V grooves 4, . . . 4, the height thereof being aligned, from one end (the left end in FIG. 1A) of the first alignment member 1 and the second alignment member 2. The sheathed portions of the fixed optical fibers 7, . . . 7, and 8, . . . 8 are supported by a mounting flange 5.

As shown in FIG. 1C, the distal ends of the movable optical fibers 9, . . . 9 are disposed at the center of the rhombic space formed by the alignment V grooves 3, . . . 3 and the alignment V grooves 4, . . . 4 from the other ends (the right end in FIG. 1A) of the first alignment member 1 and the second alignment member 2. The sheathed portions of the movable optical fibers 9, . . . 9 are supported by a mounting flange 10 of the movable side.

A drive member 13 is guided by the slit 12, which is provided in the foregoing X direction of the alignment members 1 and 2, so that it may reciprocate in the X direction. The slit 12 has a width of 1 mm or less; it receives the drive member 13 and guides it in a direction (X) perpendicular to an optical axis (Z).

The drive member 13 has slit grooves 14 and 16 as illustrated in FIGS. 1E and 1F, and the distal ends of the movable optical fibers 9, . . . 9 are inserted in the slit groove 14. An elastic pin 15 of an actuator, which will be discussed later, is engaged with the other groove 16.

The drive member 13 is driven so as to elastically press the portions near the distal ends of the movable optical fibers against the aligning reference surfaces of the first fixed optical fibers and the second fixed optical fibers alternately with a predetermined pressing force. A guide cover 17 for preventing the drive member 13 from coming off is provided; it is fixed to the top surfaces of the alignment members 1 and 2 by bonding or screwing.

FIG. 1E is a diagram illustrating a state wherein the drive member 13 has been displaced to the right as indicated by the black arrow. In this case, the drive member 13 is driven by the elastic pin 15, and as the drive member 13 is displaced, the four movable optical fibers 9 are moved to the right by the slit groove 14 until they come in contact with and are pressed against the surfaces of the V grooves 4 of the alignment member 2 and stop.

FIG. 1F is a diagram illustrating a state wherein the drive member 13 has been displaced to the left as indicated by the black arrow. In this case, as the drive member 13 is displaced, the four movable optical fibers 9 are moved to the left by the slit groove 14 until they come in contact with and are pressed against the surfaces of the V grooves 3 of the alignment member 1 and stop. The alignment members 1 and 2 employ a cemented carbide material to ensure higher machining accuracy and also to provide sufficiently high wear resistance to the repeated contact of the movable optical fibers.

Figure 2A:
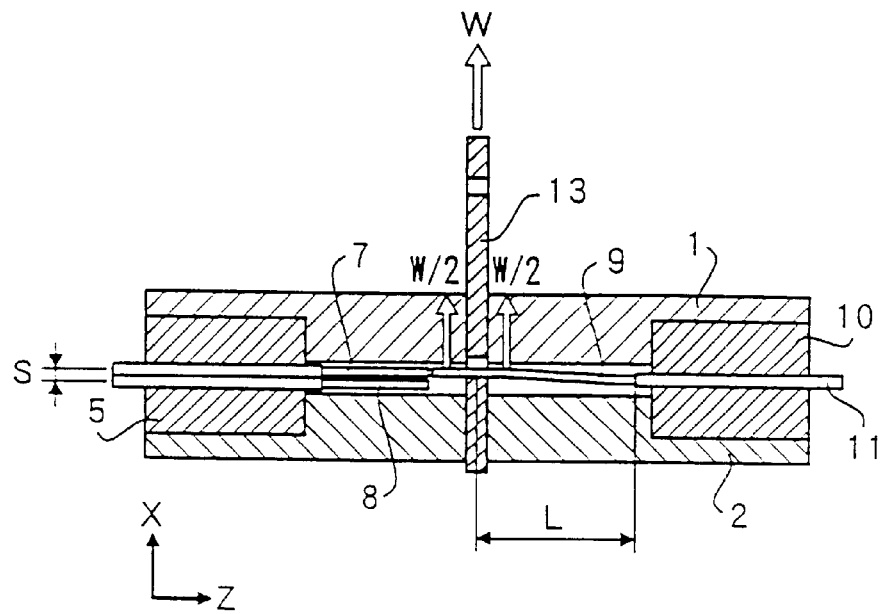
FIG. 2A is a top sectional view illustrative of a first coupling position of the embodiment.
Figure 2B:
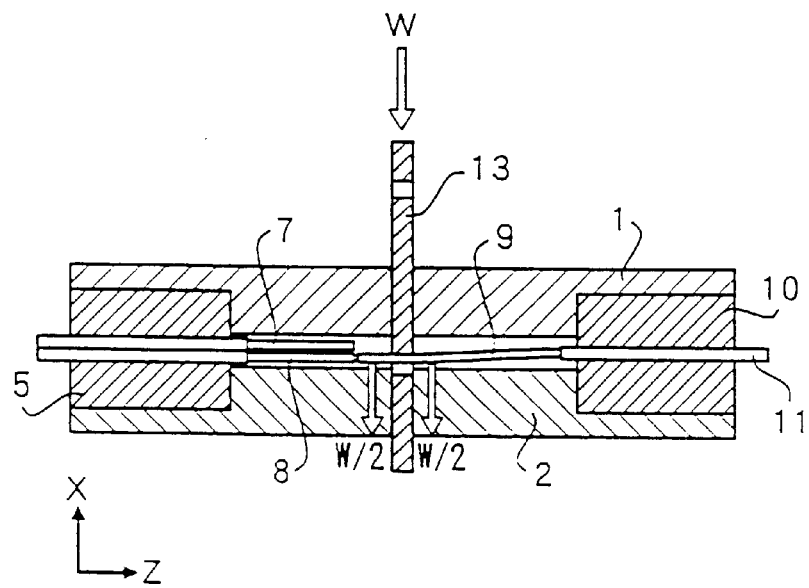
FIG. 2B is a top sectional view illustrative of a second coupling position of the embodiment.

FIGS. 2A and 2B are schematic representations illustrative of the principle regarding the driving mechanism and the push-to-align mechanism by the drive member 13 for the movable optical fibers 9, . . . 9 according to the embodiment of the N×2N (N=4) optical fiber switch shown in FIGS. 1A through 1F.

FIG. 2A illustrates a state wherein the movable optical fibers 9, . . . 9 have been lightly pressed against the V grooves of the alignment member 1 and opposed to and connected with the first fixed optical fibers 7, . . . 7. FIG. 2B illustrates a state wherein the movable optical fibers 9, . . . 9 have been lightly pressed against the V grooves of the alignment member 2 and opposed to and connected with the second fixed optical fibers 8, . . . 8. The movable optical fibers 9, . . . 9 are inserted and installed from the other ends of the alignment members 1 and 2 so that the distal ends thereof are aligned and that they provide a gap of 10 μm or less between themselves and the distal ends of the fixed optical fibers 7 and 8. The distal ends of the optical fibers 7, 8, and 9 are polished in advance so as to form them into inclined surfaces having an angle of θ degrees (where θ>4 degrees) with respect to the surface perpendicular to the optical axis in order to reduce the light that reflects and returns (see FIG. 1A).

The actuator for driving the drive member 35, may be a publicly known solenoid magnet which creates the linear movement of the movable members by switching its current polarity, or a small motor which creates the movement by switching its current polarity for forward and reverse revolution.

Figure 3A:
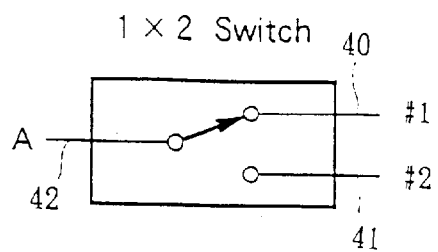
FIG. 3A is a diagram illustrative of an N×2N optical fiber switch, member or optical fiber switch which has been described with reference to FIG. 1A through FIG. 2B, when it has been set to N×2N (N=1).
Figure 3B:
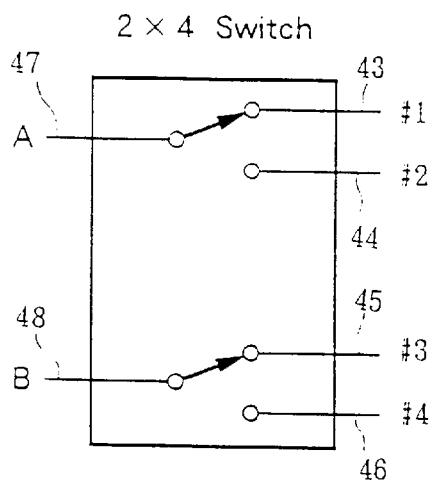
FIG. 3B is a diagram illustrative of the N×2N optical fiber switch member that has been set to N×2N (N=2).
Figure 3C:
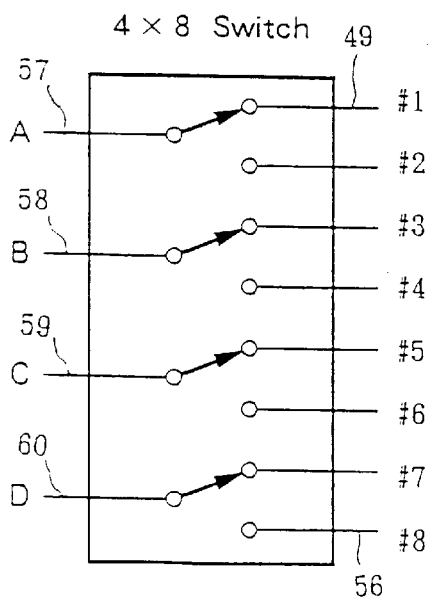
FIG. 3C is a circuit diagram illustrative of the N×2N optical fiber switch member that has been set to N×2N (N=4).

FIGS. 3A through 3C show the circuit diagrams of a 1×2 optical fiber switch, a 2×4 optical fiber switch, and a 4×8 optical fiber switch when N=1, N=2, and N=4, respectively, in the foregoing N×2N optical fiber switch.

The 1×2 optical fiber switch shown in FIG. 3A is constituted by two fixed optical fibers 40 and 41 and one movable optical fiber 42. The movable optical fiber 42 is connected to the fixed optical fibers 40 and 41 alternately by the drive member, and an optical fiber port A can be connected to optical fiber ports #1 and #2 alternately.

The 2×4 optical fiber switch circuit shown in FIG. 3B is composed of four fixed optical fibers 43 through 46 and two movable optical fibers 47 and 48. The movable optical fibers 47 and 48 are connected to a pair of fixed optical fibers 43 and 45 and another pair of fixed optical fibers 44 and 46 alternately by the drive member. Optical fiber ports A and B can be connected to optical fiber ports #1, #3 and #2, #4 alternately and in synchronization.

The 4×8 optical fiber switch of FIG. 3C is composed of eight fixed optical fibers 49 through 56 and four movable optical fibers 57 through 60. The movable optical fibers 57 through 60 are connected to a set of fixed optical fibers 49, 51, 53, and 55 and another set of fixed optical fibers 50, 52, 54, and 56 alternately by the drive member. Optical fiber ports A through D can be connected to optical fiber ports #1, #3, #5, and #7, and #2, #4, #6, and #8 alternately and in synchronization.

Thus, the N×2N optical fiber switch used for an optical fiber switch circuit in accordance with the present invention includes the 2N number of fixed optical fibers comprised of a pair of the N number of fixed optical fibers, and the N number of movable optical fibers that are installed in the V groove array of a pair of alignment members. The optical fiber ports of the N number of circuits can be connected to other optical fiber ports composed of the N number of circuits, respectively, alternately and in synchronization by the reciprocating motion of the single drive member 13. Hence, in the case of an optical fiber switch with a high integration of optical fiber ports, the switch volume can be made markedly smaller than the conventional optical fiber switch comprised of the combination of many 1×2 switches. Moreover, the number of actuators can be also decreased. As a result, the whole configuration can be simplified, leading to higher reliability of the circuitry.

The embodiments of the optical fiber switches constructed primarily by combining the optical fibers shown in FIGS. 3A–3C will now be described.

Figure 4A:
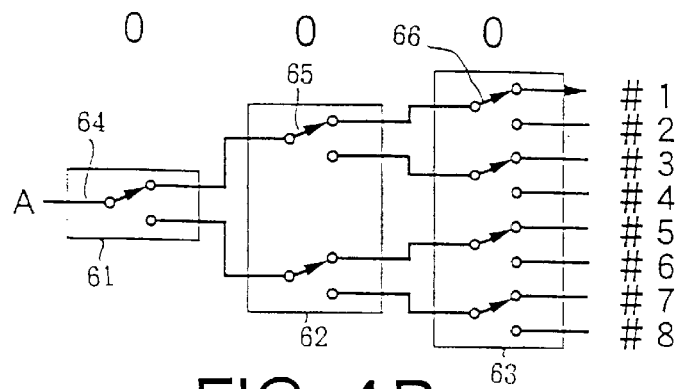
FIG. 4A is a circuit diagram showing an 1 optical fiber switching circuit at a first connecting position thereof, the optical fiber switching circuit being constituted by connecting in series the 1×2 optical fiber switch member, the 2×4 optical fiber switch member, and the 4×8 optical fiber switch member shown in FIG. 3A through FIG. 3C.
Figure 4B:
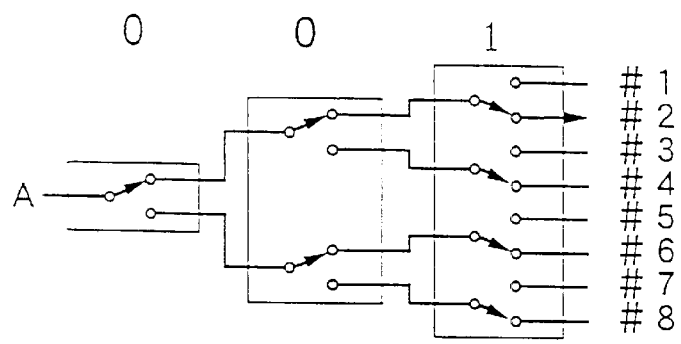
FIG. 4B is a circuit diagram showing the optical fiber switching circuit of FIG. 4A at a second connecting position thereof.
Figure 4C:
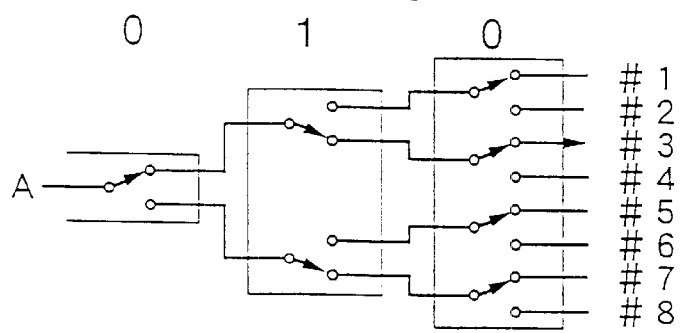
FIG. 4C is a circuit diagram showing the optical fiber switching circuit of FIG. 4A at a third connecting position thereof.
Figure 4D:
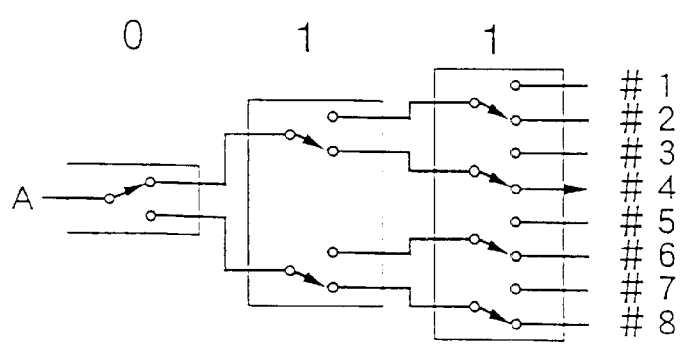
FIG. 4D is a circuit diagram showing the optical fiber switching circuit of FIG. 4A at a fourth connecting position thereof.
Figure 4E:
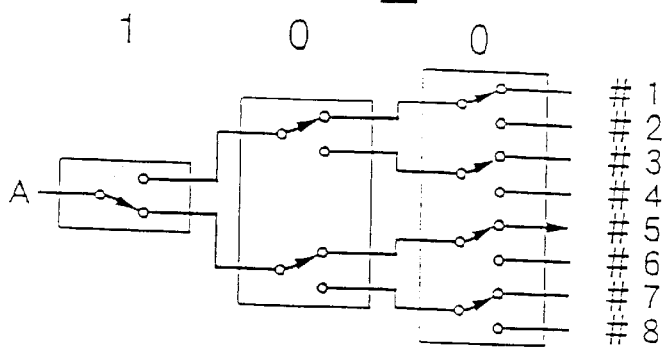
FIG. 4E is a circuit diagram showing the optical fiber switching circuit of FIG. 4A at a fifth connecting position thereof.
Figure 4F:
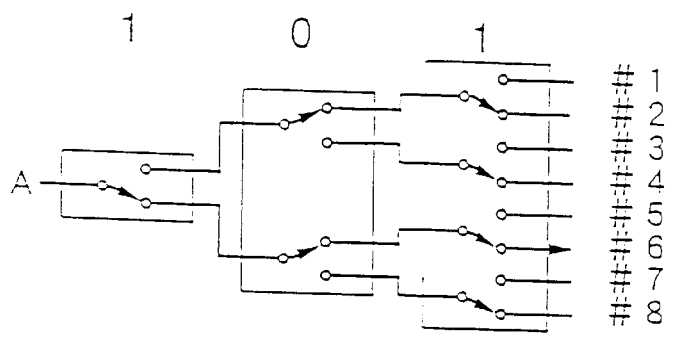
FIG. 4F is a circuit diagram showing the optical fiber switching circuit of FIG. 4A at a sixth connecting position thereof.
Figure 4G:
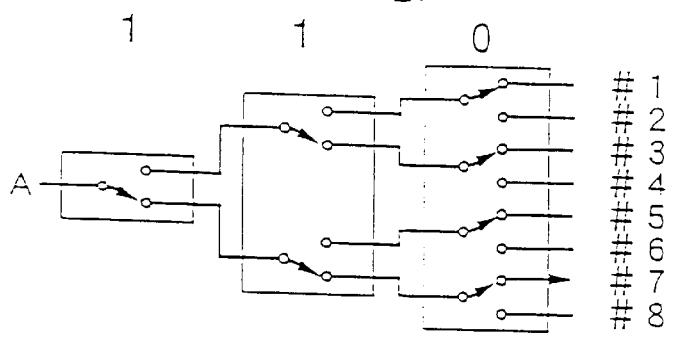
FIG. 4G is a circuit diagram showing the optical fiber switching circuit of FIG. 4A at a seventh connecting position thereof.
Figure 4H:
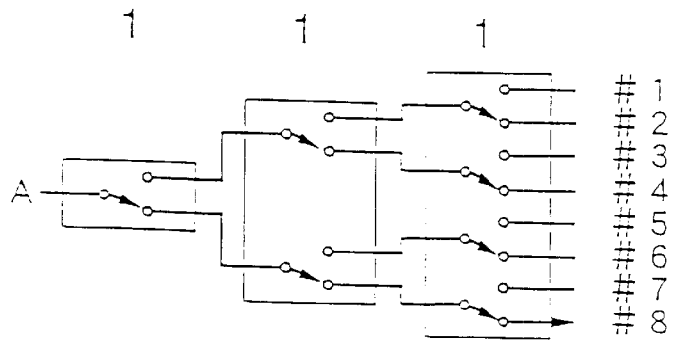
FIG. 4H is a circuit diagram showing the optical fiber switching circuit of FIG. 4A at an eighth connecting position thereof.

FIG. 4A is a circuit diagram of an optical fiber switch circuit having one input (M=1) composed by connecting in series n switching members 61–63 the 1×2 optical fiber switch, 61 the 2×4 optical fiber switch 62, and the 4×8 optical fiber switch 63 respectively shown in FIG. 3A through FIG. 3C. FIGS. 4A through 4 individually illustrate the shifted positions of the drive members of the respective switches when the connection of the port A is shifted from the port #1 to the port #8 in sequence in the optical fiber switch circuit. The state wherein the drive members of the 1×2 optical fiber switch 61, the 2×4 optical fiber switch 62, and the 4×8 optical fiber switch 63 have moved to the upper side is denoted as 0, and the state wherein they have moved to the lower side is denoted as 1. To connect the port A of the optical fiber to the port #1 as shown in FIG. 4A, the positions of the three drive members are set to 0-0-0. For instance, to connect the port A of the optical fiber to the port #6 as illustrated in FIG. 4F, the positions of the three drive members are set to 1-0-1.

As set forth above, it is extremely simple to connect the respective optical fiber ports of the optical fiber switch circuit shown in FIGS. 4A to 4H comprised of the N×2N optical fiber switches (N=1, 2, 4) in accordance with the present invention. In other words, only three control circuits are required to operate the optical fiber switches easily by combining the upward or downward shifts of the three drive members in comparison with the conventional case in which seven 1×2 optical fiber switches have been operated by seven pairs of control circuits.

Figure 5A:
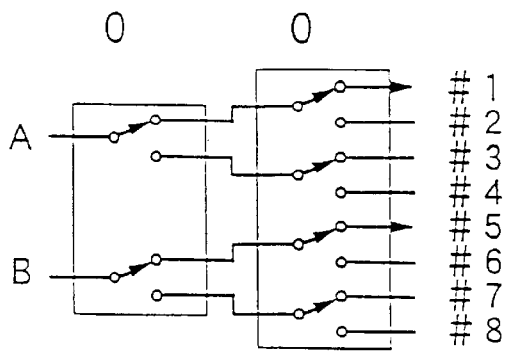
FIG. 5A is a diagram showing a optical fiber switching circuit at a first connecting position thereof, the optical fiber switch being constituted by connecting in series the 2× 4 optical fiber switch member and the 4×8 optical fiber switch member shown in FIG. 3B and FIG. 3C.
Figure 5B:
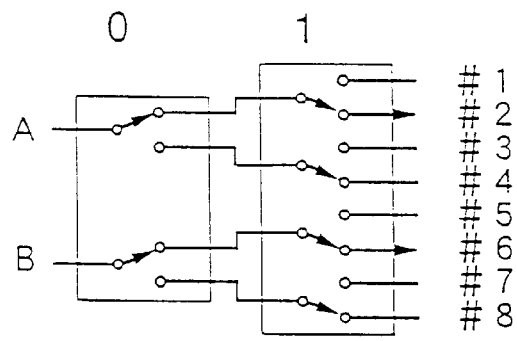
FIG. 5B is a circuit diagram showing the optical fiber switching circuit of FIG. 5A at a second connecting position thereof.
Figure 5C:
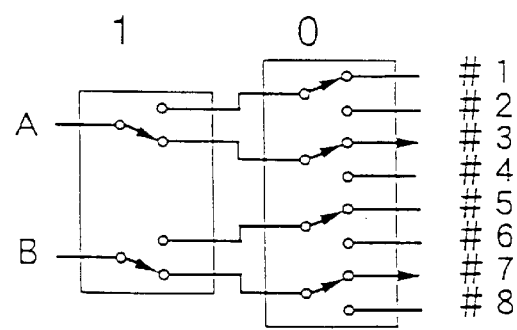
FIG. 5C is a circuit diagram showing the optical fiber switching circuit of FIG. 5A at a third connecting position thereof.
Figure 5D:
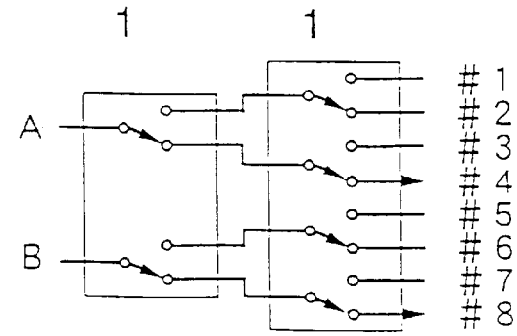
FIG. 5D is a circuit diagram showing the optical fiber switching circuit of FIG. 5A at a fourth connecting position thereof.

FIG. 5A is a circuit diagram of an optical fiber switch circuit having 2 inputs (M=2) composed by connecting in series the 2×4 optical fiber switch member and the 4×8 optical fiber switch member shown in FIG. 3B and FIG. 3C. FIGS. 5A through 5D individually illustrate the shifted positions of the drive members of the respective switches when the connection of the port A is shifted from the port #1 to the port #4, and the port B is shifted from the port #5 to the port #8 in sequence in the optical fiber switch circuit. As previously mentioned, when the state wherein the drive members have moved to the upper side is denoted as 0, and the state wherein they have moved to the lower side is denoted as 1, the optical fiber switches can be easily operated merely by combining the upward or downward shifts of the two drive members as illustrated.

Thus, it can be easily understood that the embodiment permits easy operation of the optical fiber switches. In contrast to the conventional optical fiber switch circuit having two inputs and 8 outputs in which six optical fiber switches are operated by six pairs of control circuits, the embodiment makes it possible to operate the optical fiber switch circuit simply by combining the upward or downward shifts of two drive members moved by two control circuits.

Figure 6:
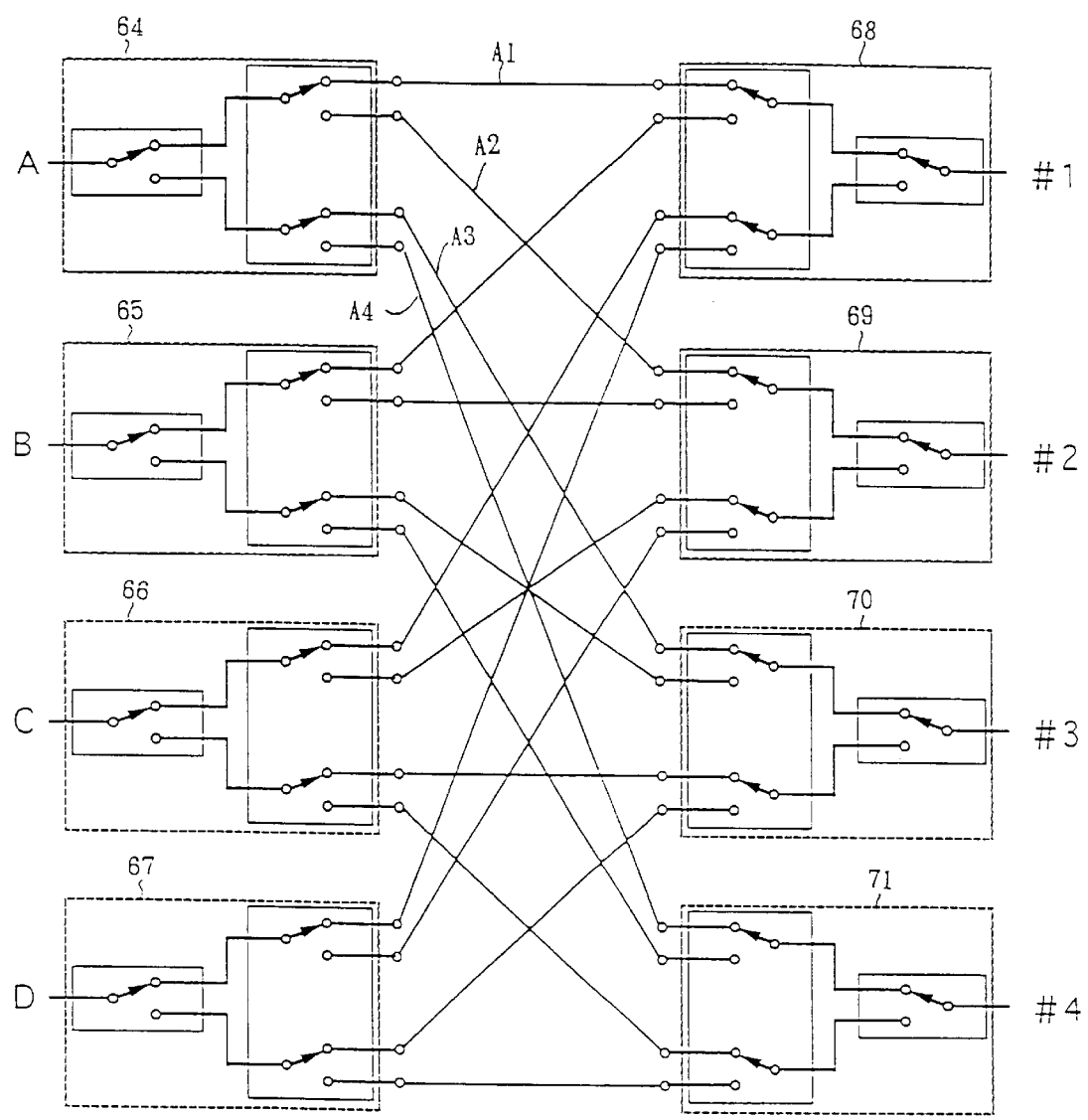
FIG. 6 is a circuit diagram showing a matrix optical fiber switching circuit of FIG. 5A circuit composed by using N×2N optical fiber switchs.
Figure 7:
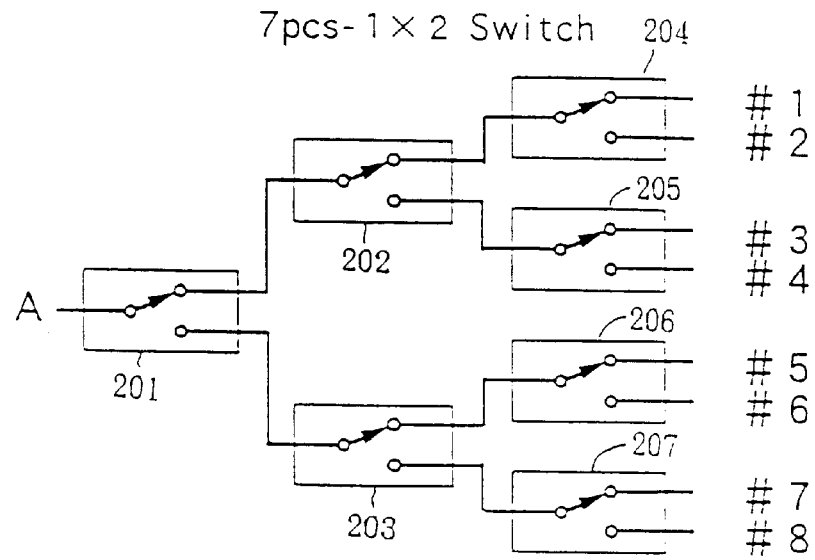
FIG. 7 is a circuit diagram showing an optical fiber switch circuit composed by connecting seven conventional 1×2 circuit optical fiber switches.
Figure 8:
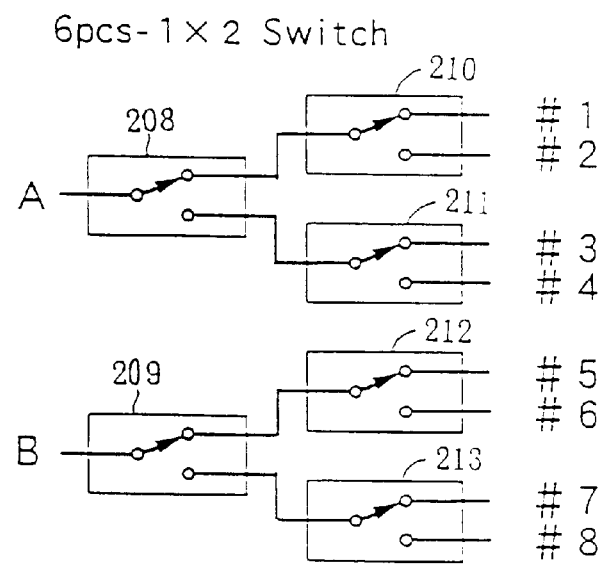
FIG. 8 is a circuit diagram showing an optical fiber switch circuit composed by connecting six conventional 1×2 circuit optical fiber switches.
Figure 9:
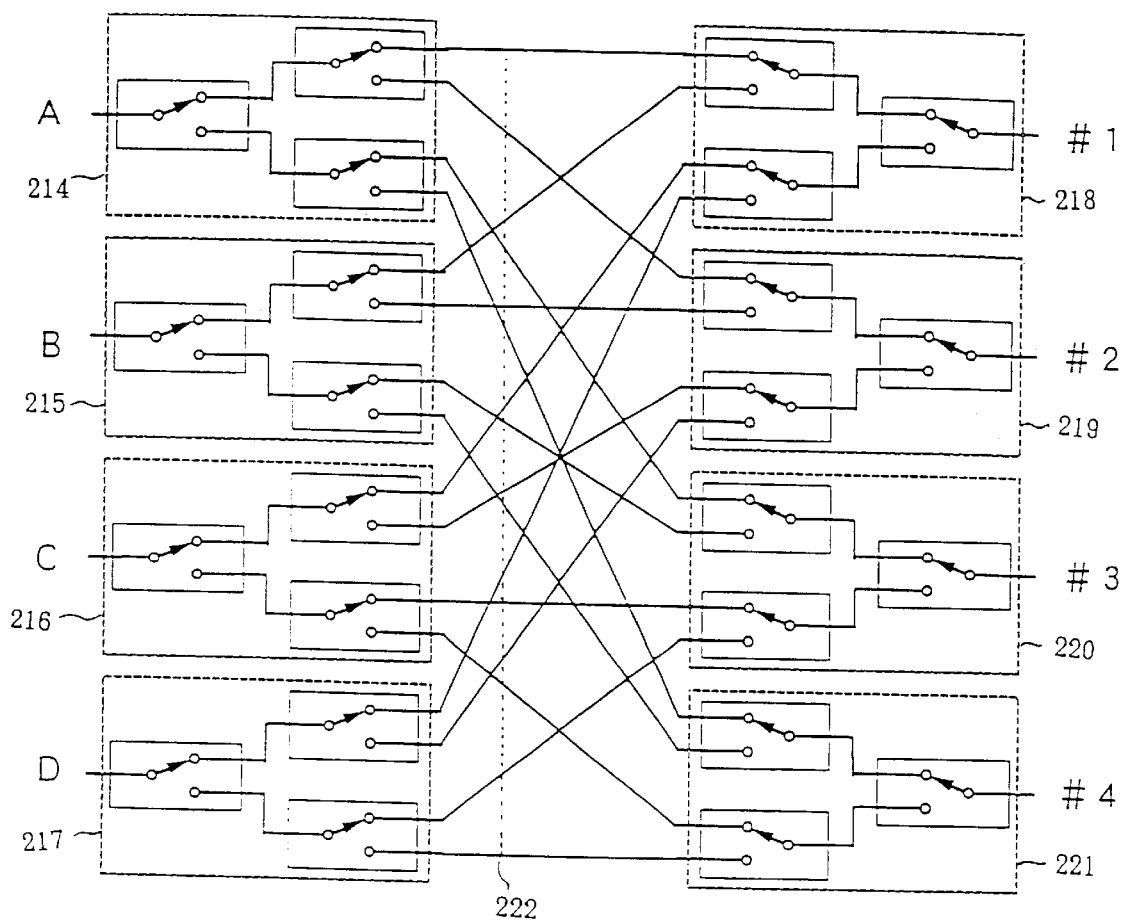
FIG. 9 is a circuit diagram showing a matrix optical fiber switch circuit composed by using twenty-four conventional 1×2 circuit optical fiber switches.

FIG. 6 is a circuit diagram showing an embodiment of a matrix optical fiber switch circuit having 4 inputs and 4 outputs constituted by connecting two sets of optical fiber switch circuits comprised by connecting in series the 1×2 optical fiber switch and the 2×4 optical fiber switch shown in FIG. 2A and FIG. 2B. The matrix optical fiber switch circuit of FIG. 6 is configured by two groups, one group including four optical fiber switches 64 through 67 in the left column each consisting of three 1×2 optical fiber switches and the other group including four optical fiber switches 68 through 71 in the right column each consisting of three 1×2 optical fiber switches.

As illustrated, four optical fibers A1, A2, A3, and A4 of the four circuits of the optical fiber switch 64 in the left column are respectively connected to the four optical fiber switches 68 through 71 in the right column. Likewise, the four optical fibers of the four circuits of the remaining three optical fiber switches 65 through 67 in the left column are respectively connected to the four optical fiber switches 68 through 71 in the right column.

In this 4×4 matrix optical fiber switch circuit, ports A, B, C, and D of the four optical fiber switches 64 through 67 in the left column can be connected to any of ports #1, #2, #3, and #4 of the four optical fiber switches 68 through 71 in the right column. Each of the eight optical fiber switches constituting the 4×4 matrix optical fiber switch in accordance with the present invention is configured by connecting one 1×2 optical fiber switch and one 2×4 optical fiber switch in series as mentioned above. Therefore, a total of 16 optical fiber switches, i.e. a total of 16 drive members and 16 actuators, are necessary.

Using the conventional 1×2 optical fiber switches to constitute the 4×4 matrix optical fiber switch enabling the equivalent circuit connection to that described above would require 24 switches and 24 actuators.

Hence, the 4×4 matrix optical fiber switch constructed by employing the optical fiber switch in accordance with the present invention permits a smaller size and more reliable operation.

What is claimed is:

1. An optical fiber switch member comprising:

an alignment member main body having a plurality of first and second V-shaped grooves, said first and second grooves being arranged opposing each other to form pairs of said grooves extending parallel to a Z-direction and aligned in a Y-direction substantially perpendicular to said Z-direction, said main body having a slit traversing said V-shaped grooves in an X-direction substantially perpendicular to said Z and Y directions;

a 2N number of fixed optical fibers, including N first fixed optical fibers and N second fixed optical fibers, located in said alignment member main body on a first side of said slit, where N is a number equal to or greater than one, said first fixed optical fibers being positioned in said first grooves and said second fixed optical fibers being positioned in said second pairs of grooves, one first fixed optical fiber and one second fixed optical fiber being positioned in each of said first and second opposing grooves, respectively;

an N number of movable optical fibers located in said alignment member main body on a second side of said slit opposite the first side thereof, one of said movable optical fibers being positioned in each pair of first and second opposing grooves so that a distal end thereof is adjacent a fixed optical fiber and in contact with one of said first and second grooves;

a resilient pin; and a movable drive member inserted in said slit for engaging said movable optical fibers, said drive member being driven by said resilient pin to move said movable optical fibers to a first position for optical coupling to said first fixed optical fibers and contacting said first grooves, and to a second position for optical coupling to said second fixed optical fibers and contacting said second grooves, said optical fiber switch member comprising N 1×2 optical fiber switches.

2. An optical fiber switching circuit having M inputs and comprising a plurality of optical fiber switch members in accordance with claim 1, said switching circuit including a series connection of n optical fiber switch members, the $n^{th}$ switch member having $2^{n-1}$M optical fiber switches therein, a single drive member driving the N optical fiber switches in each of said n switching members via said resilient pin.

3. An optical fiber switching circuit as defined by claim 2 wherein M=1 and n=2, said switching circuit having one input and four outputs.

4. An optical fiber switching circuit as defined by claim 2 wherein M=1 and n=3, said switching circuit having one input and eight outputs.

5. An optical fiber switching circuit as defined by claim 2 wherein M=2 and n=2, said switching circuit having two inputs and eight outputs.

6. An optical fiber matrix switching circuit comprising a plurality of switching circuits as defined by claim 3, including a first grouping of p (p≧2) switching circuits arranged to have p group inputs and $p^2$ group outputs and a second grouping of p switching circuits arranged to have p group inputs and $p^2$ group outputs, wherein each output of each switching circuit in said first grouping is provided as input to a different switching circuit in said second grouping.

7. An optical fiber matrix switching circuit as defined by claim 6 wherein p=4, M=1, and n=2, said matrix switching circuit being a 4×4 switch.

8. An optical fiber switching circuit comprising M optical fiber switches as defined by claim 1 wherein N=1, said M optical fiber switches being arranged side-by-side such that said switching circuit has M inputs and 2M outputs.

9. An optical fiber matrix switching circuit comprising a first plurality of p switching circuits and a second plurality of p switching circuit, each of said first and second plurality of switching circuit having n switching circuit members, M inputs and $2^n$Mp outputs, each output of said first plurality of switching circuits being coupled to an output of a different switching circuit of said second plurality of switching circuits.

10. An optical fiber matrix switching circuit as defined by claim 9 wherein p=4, M=1, and n=2, said matrix switching circuit having eight inputs and sixteen outputs.

* * * * *